US011906728B2

(12) United States Patent
Baran et al.

(10) Patent No.: US 11,906,728 B2
(45) Date of Patent: Feb. 20, 2024

(54) PIXEL SHIFTING DEVICE (71) Applicant: Microsoft Technology Licensing, LLC, Redmond, WA (US)

(72) Inventors: Utku Baran, Mercer Island, WA (US); Wyatt Owen Davis, Bothell, WA (US); Fei Chen, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 73 days.

(21) Appl. No.: 17/360,193

(22) Filed: Jun. 28, 2021

(65) Prior Publication Data

US 2022/0334379 A1 Oct. 20, 2022

Related U.S. Application Data (60) Provisional application No. 63/176,095, filed on Apr. 16, 2021.

(51) Int. Cl.
*G02B 26/08* (2006.01)
*G02B 5/32* (2006.01)

(52) U.S. Cl.
CPC ........... *G02B 26/0883* (2013.01); *G02B 5/32* (2013.01)

(58) Field of Classification Search
CPC ........ G02B 26/0883; G02B 5/32; G02B 5/08; G02B 5/0808; G02B 26/0858; G02B 26/08; G02B 26/0808; G02B 26/0816; G02B 26/085; G02B 26/101; G02B 26/105; G02B 26/106; G02B 26/108
USPC ......... 359/197.4, 198.1, 201.1, 212.1, 214.1, 359/213.1, 202.1, 201.2, 200.6, 200.7, 359/199.3, 199.2, 199.4

See application file for complete search history.

(56) References Cited

U.S. PATENT DOCUMENTS

| 6,108,036 | A | 8/2000 | Harada et al. | |
|---|---|---|---|---|
| 6,198,565 | B1 * | 3/2001 | Iseki | G02B 26/0858 359/224.1 |
| 2002/0171901 | A1 * | 11/2002 | Bernstein | B81B 3/0021 359/224.1 |
| 2008/0080037 | A1 | 4/2008 | Oh et al. | |
| 2018/0011285 | A1 * | 1/2018 | Aschwanden | H04N 9/3188 |
| 2019/0278102 | A1 | 9/2019 | Suter et al. | |
| 2019/0346684 | A1 | 11/2019 | Chou | |
| 2020/0185590 | A1 * | 6/2020 | Malhotra | B05D 3/108 |
| 2020/0241286 | A1 * | 7/2020 | Ishida | G02B 26/101 |

(Continued)

FOREIGN PATENT DOCUMENTS

| EP | 3492959 A1 | 6/2019 |
|---|---|---|
| JP | 2011232589 A | 11/2011 |

OTHER PUBLICATIONS

"International Search Report and Written Opinion Issued in PCT Application No. PCT/US22/022417", dated Jul. 7, 2022, 11 Pages.

(Continued)

*Primary Examiner* — Jade R Chwasz
(74) *Attorney, Agent, or Firm* — Alleman Hall & Tuttle LLP (57) ABSTRACT Examples are disclosed that relate to pixel-shifting devices for increasing display resolution. An example pixel-shifting device comprises an outer frame, an inner frame coupled to the outer frame via a flexure, a path-shifting optical element mounted to the inner frame, and one or more piezoelectric actuators configured to drive motion of the inner frame.

18 Claims, 7 Drawing Sheets

(56) References Cited

U.S. PATENT DOCUMENTS

2020/0341265 A1    10/2020    Baran
2020/0355910 A1    11/2020    Smolka et al.

OTHER PUBLICATIONS

"Beam Shifting—Optotune", Retrieved from: https://web.archive.org/web/20210109025440/https://www.optotune.com/beam-shifting, Jan. 9, 2021, 2 Pages.

* cited by examiner

PIXEL SHIFTING DEVICE

CROSS REFERENCE TO RELATED APPLICATIONS

This application claims priority to U.S. Provisional Patent Application Ser. No. 63/176,095, filed Apr. 16, 2021, entitled "PIXEL SHIFTING DEVICE", the entirety of which is hereby incorporated herein by reference for all purposes.

BACKGROUND

A pixel shifting device can be used to increase the resolution of a display device compared to the resolution of an image producing element used by the display device (e.g. a liquid crystal on silicon (LCoS) or microLED display) by shifting the apparent location of displayed pixels for sequentially displayed image subframes.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Examples are disclosed that relate to pixel-shifting devices for increasing display resolution. One example provides a pixel-shifting device comprising an outer frame, an inner frame coupled to the outer frame via a flexure, a path-shifting optical element mounted to the inner frame, and one or more piezoelectric actuators configured to drive motion of the inner frame.

DETAILED DESCRIPTION

As mentioned above, in display systems utilizing projection optics, images of higher resolution than an image producing element used by the display system may be displayed by subdividing an image into a plurality of image subframes, and displaying the subframes sequentially while spatially shifting the display of each image subframe relative to other image subframes to form the full image frame. Such shifting of the image subframes may be done by a mechanical pixel-shifting device. Current pixel-shifting devices may utilize a path-shifting optical element (e.g. a prism) that is controllable via electromagnetic actuators to tilt with respect to one or two axes, thereby shifting the path of projected light for each image subframe to increase image resolution. However, conventional mechanical pixel-shifting devices may be bulky and consume relatively high amounts of power, and thus may not be suitable for small form factor devices, such as mobile display devices.

Accordingly, examples are disclosed that relate to a pixel-shifting device utilizing a path-shifting optical element that is tiltable via piezoelectric elements. Briefly, the disclosed example pixel-shifting devices include an outer frame, an inner frame coupled to the outer frame via one or more flexures, a path-shifting optical element mounted to the inner frame, one or more piezoelectric actuators each comprising a piezoelectric material and configured to drive motion of the inner frame, and one or more transmissions each configured to transmit motion of a corresponding piezoelectric actuator to the inner frame. The use of a piezoelectric actuation system instead of electromagnetic actuators may consume relatively less power, and thus provide for longer operation between charges on a battery-operated device, such as a mobile device.

Figure 1:
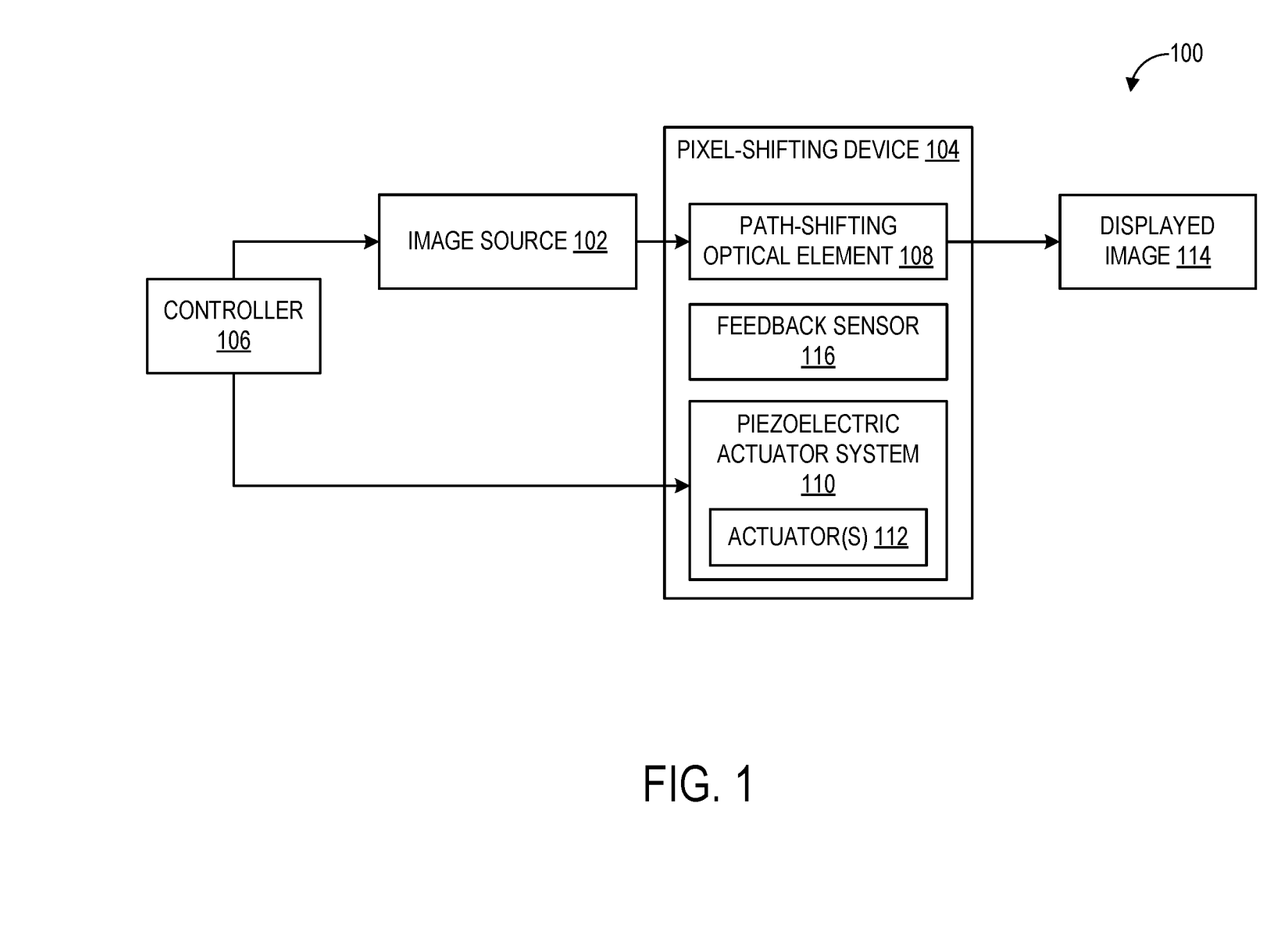
FIG. 1 schematically shows an example display device.

FIG. 1 shows a block diagram of an example display device 100 comprising an image source 102 that outputs image subframes to a pixel-shifting device 104. Display device 100 further comprises a controller 106 configured to control image source 102 to display image sub-frames, and to control pixel-shifting device 104 to adjust the apparent location of pixels between subframes to display full images via the time-sequential display of the subframes. Image source 102 may comprise any suitable image-producing device, including an LCoS display or a microLED display. Various other optics not shown in FIG. 1 may be included as well, depending upon a configuration of display device 100.

Pixel-shifting device 104 comprises a path-shifting optical element 108 and a piezoelectric actuator system 110 comprising a plurality of piezoelectric actuators 112. Piezoelectric actuator system 110 is controllable to vary an angle of path-shifting optical element 108 relative to an image source 102 to thereby control the positions at which subframes of a displayed image 114 appear. An angle of path-shifting optical element 108 is varied by rotational movement around a single axis, or around two axes in some examples. Pixel-shifting device 104 further comprises a feedback sensor 116 to provide feedback for a driver circuit. Display device 100 may take any suitable form, such as that of a head-mounted display device, as well as other types of projection displays.

Figure 2A:
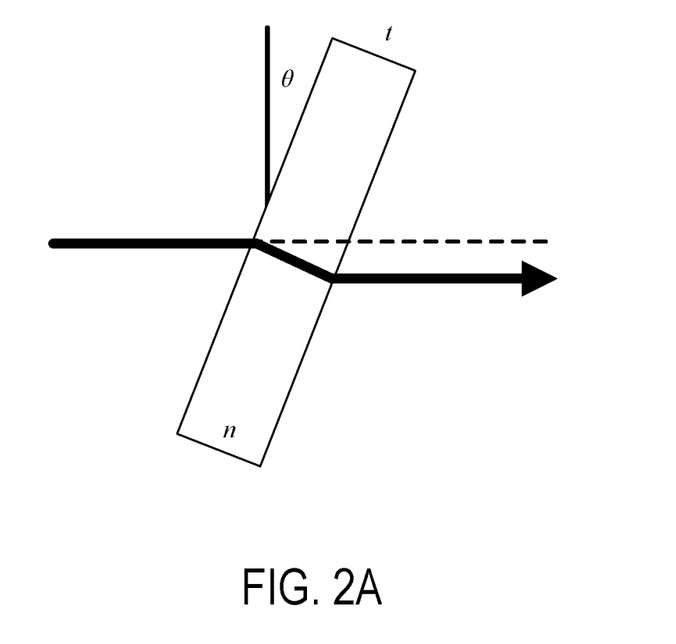
FIGS. 2A and 2B respectively illustrate an example operation of a pixel-shifting device, and an example of spatially shifted pixels.
Figure 2B:
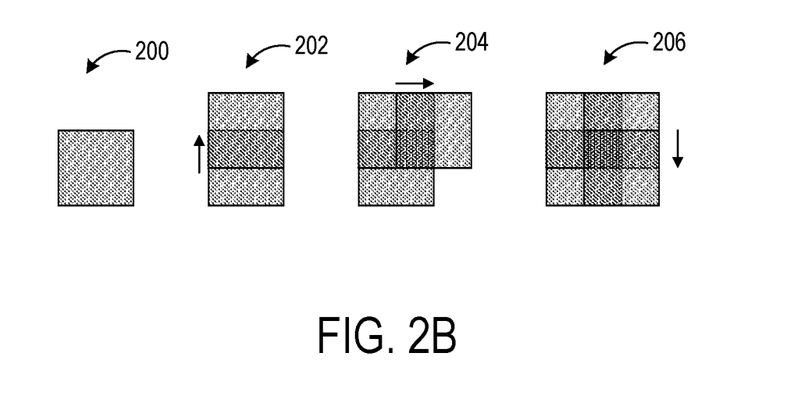

FIGS. 2A and 2B schematically illustrate the shifting of a pixel 200 on a display device, such as display device 100. First, FIG. 2A shows how an apparent position of a pixel can be varied by varying an angle of a path-shifting optical element. In this example, as the angle θ of the path-shifting optical element relative to incident light varies by tilting the optic clockwise (with reference to the perspective of FIG. 2A), the optical axis shifts from the dashed line location to the solid arrow location, causing the apparent location of pixels to shift accordingly.

FIG. 2B schematically shows a pixel location varied in two directions. At 202, pixel 200 is shifted upwardly by a fraction of the pixel, e.g. half of the pixel. At 204, pixel 200 is shifted to the right by the same fraction, and at 206, pixel 200 is shifted downwardly by the same fraction. In this manner, each pixel can be projected to multiple locations—in this example, up to four locations. Thus, displaying different subframes of an image at the different locations shown in FIG. 2B in a time-sequential manner at a sufficient subframe rate for the eye to perceive the subframes as a single combined image allows the resolution of an overall displayed image formed by the combination of the subframes to exceed the resolution of the display panel used to form the subframes. In some examples, one or more of separate red, green or blue sub-pixels of a pixel may be shifted by fractions of a pixel for each subframe to form color-sequential subframes.

Figure 3:
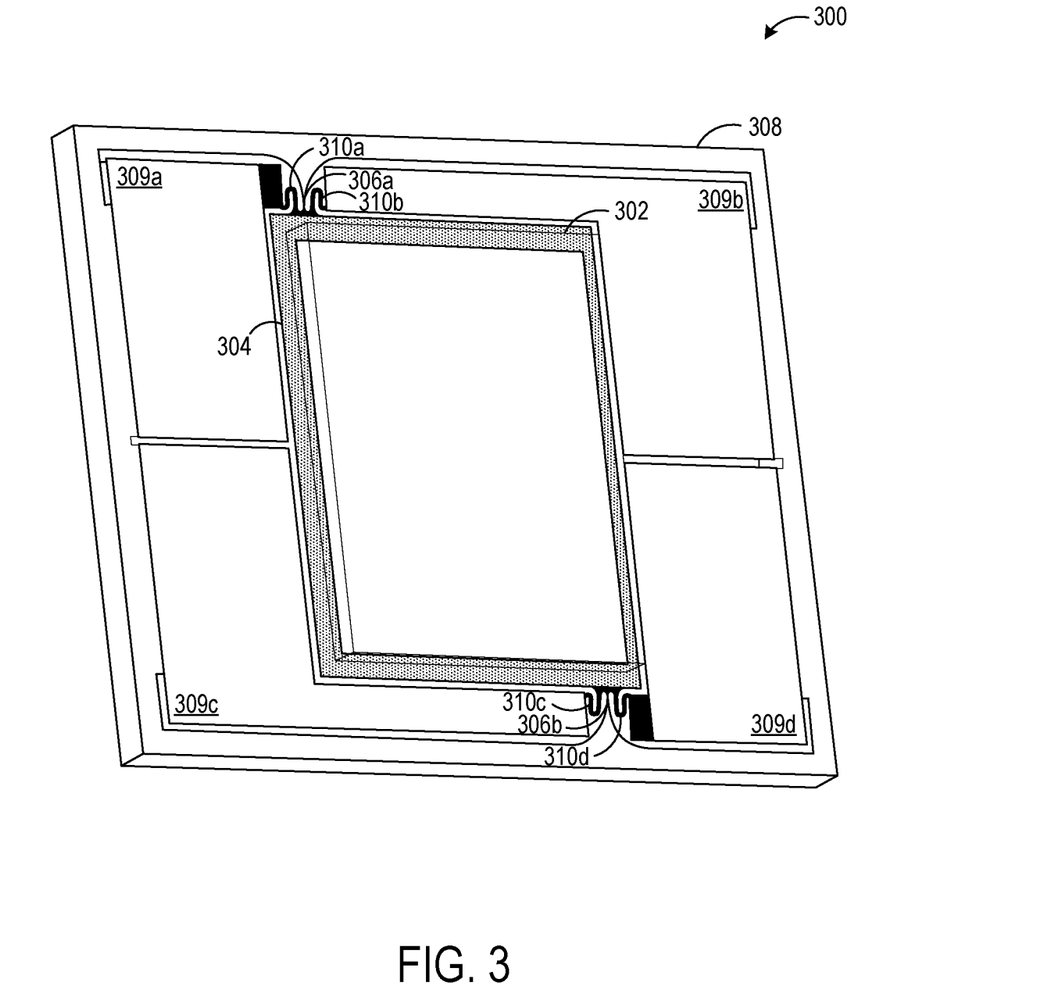
FIG. 3 shows an example pixel-shifting device comprising piezoelectric actuators.

FIG. 3 shows an example pixel-shifting device 300 suitable for use as pixel-shifting device 104 of FIG. 1. Pixel-shifting device 300 comprises a path-shifting optical element 302 coupled to an inner frame 304. Path-shifting optical element 302 may take the form of a refractive optical element (e.g. a prism, one or more holographic optical elements), a reflective optical element (e.g. a mirror), a diffractive optical element, or any other suitable optical structure. The inner frame 304 is attached to an outer frame 308 by flexures 306a, 306b that undergo torsional motion during rotational movement of the path-shifting optical element 302. Further, a plurality of piezoelectric actuators 309a-d each comprising a film of a piezoelectric material are coupled to the outer frame 308. The film of piezoelectric material may be deposited and patterned on the structure forming the inner and outer frames. Each piezoelectric actuator 309a-d is located adjacent to a corresponding transmission 310a-d that is coupled to the inner frame 304. In other examples, one or more transmissions each may connect to a flexure rather than to the inner frame 304.

Each transmission 310a-d transmits movement from a corresponding piezoelectric actuator 309a-d to the inner frame 304, thereby causing rotation of the inner frame 304 along an axis that extends between opposite flexures 306a, 306b, and thus rotating path-shifting optical element 302. Each transmission 310a-d is shown as having a curved, sinuous configuration. Such a configuration can amplify the motion of the corresponding piezoelectric actuator 309a-d by providing a greater range of motion than a shorter, uncurved transmission. In other examples, the transmissions may have any other suitable configuration, including other curved configurations, or various uncurved configurations.

Figure 4:
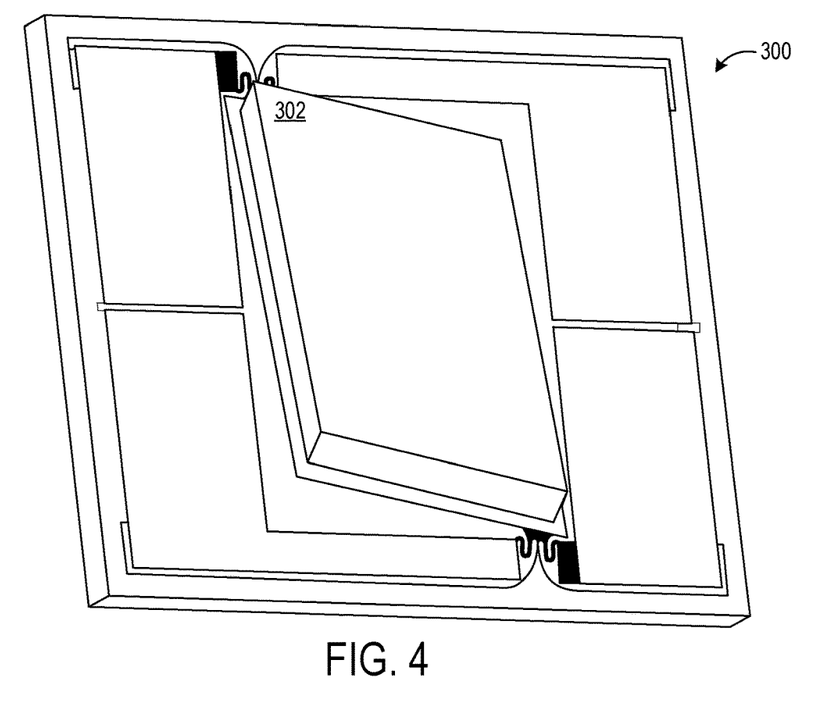
FIG. 4 shows an example pixel-shifting device with an inner frame and path-shifting optical element rotated out of plane compared to an outer frame.

In FIG. 3, each flexure 306a, 306b is positioned along a side of inner frame 304 at a location spaced from a center of the side. By offsetting each flexure 306a, 306b from the center of its corresponding side of inner frame 304, path-shifting optical element 302 can rotate around a diagonally oriented axis of rotation, with reference to the rectangular configuration of inner frame 304. FIG. 4 shows the example pixel-shifting device 300 with path-shifting optical element 302 tilted diagonally. The use of a diagonal axis of rotation may allow for a greater range of angular motion than configurations that use non-diagonal axes of rotation. In the example of FIGS. 3 and 4, the positions and shapes of flexures 306a-b, transmissions 310a-d, and piezoelectric actuators 309a-d help to achieve a relatively large range of motion of the path-shifting optical element 302 while keeping an overall size of the path-shifting optical element 302 relatively small. Further, the use of thin film piezoelectric actuators may consume less power than electromagnetically driven pixel-shifting devices.

Figure 5:
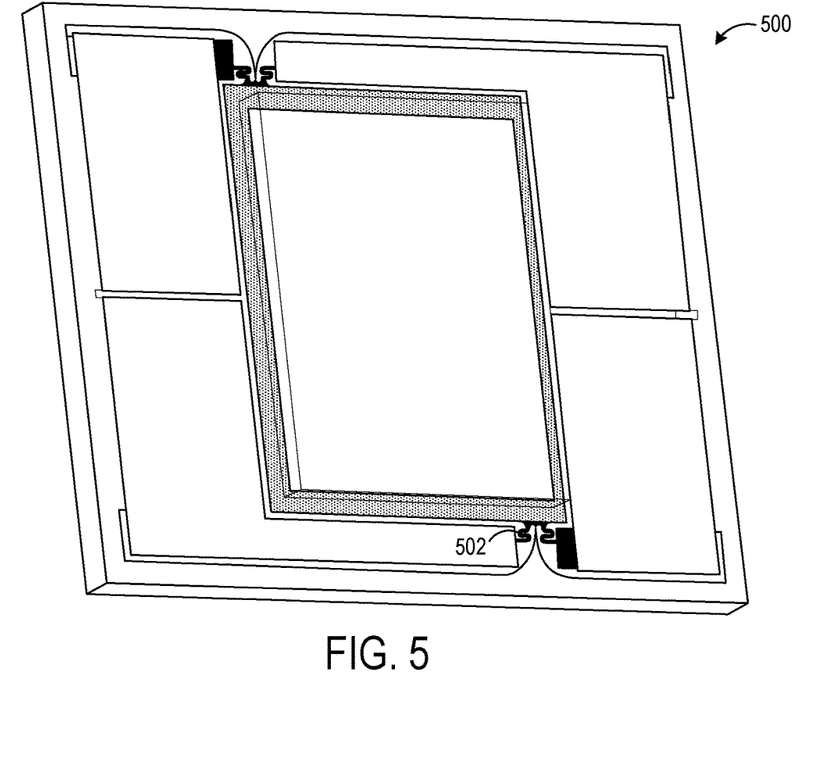
FIG. 5 shows an example pixel-shifting device having a different transmission configuration than that of FIG. 3.

FIG. 5 shows another example of pixel-shifting device 500, and illustrates example transmissions 502 that have different configurations than those of FIG. 3. As mentioned above, the curved configuration of the transmissions increases the length of each transmission, which may help to amplify motion relative to the use of uncurved transmissions.

Figure 6:
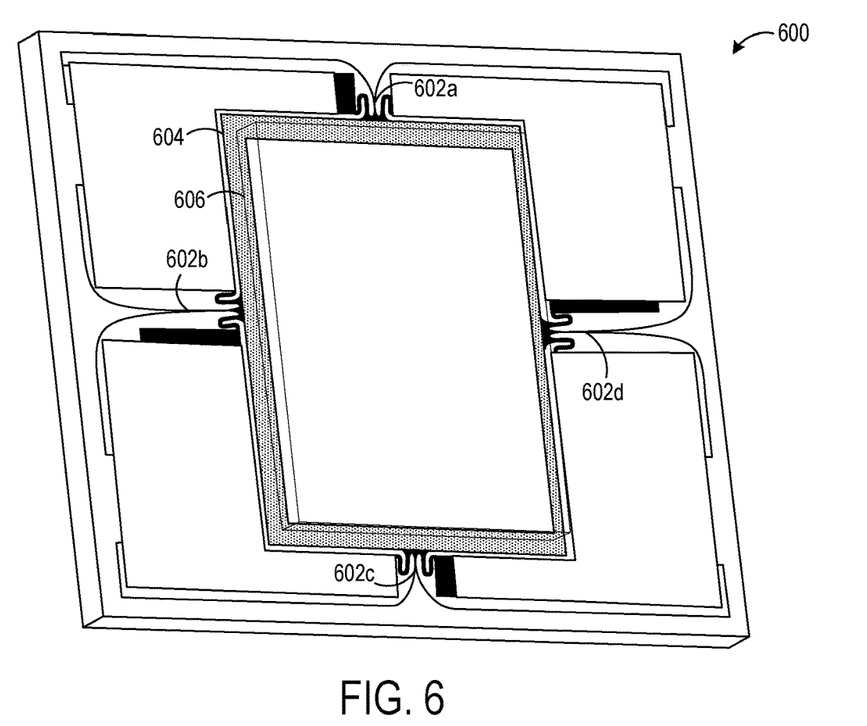
FIG. 6 shows an example pixel-shifting device configured for rotational motion about two axes.

As mentioned above, in the examples of FIGS. 3-5, the path-shifting optical element is configured to rotate diagonally with reference to a shape of the inner frame. In other examples, rather than rotating along a diagonal axis, the components of a pixel-shifting device may be arranged to rotate the path-shifting optical element in one or two directions (e.g. roll and pitch), each along a non-diagonal axis. For example, in such an arrangement, flexures and transmissions may be positioned approximately at a center location of a corresponding side of the inner frame. FIG. 6 shows one example pixel-shifting device 600 that includes four flexures 602a-d with corresponding transmissions, each flexure positioned approximately at a center location of a corresponding side of the inner frame 604 mounting the path-shifting optical element 606, which may provide for rotation along two perpendicular axes (e.g. roll and pitch). The configuration of FIG. 6 may provide for more freedom over tilt direction by utilizing four different flexures. In other examples, instead of four flexures, three flexures may be spaced around the perimeter of the inner frame to provide for control of tilt along two different axes.

Figure 7:
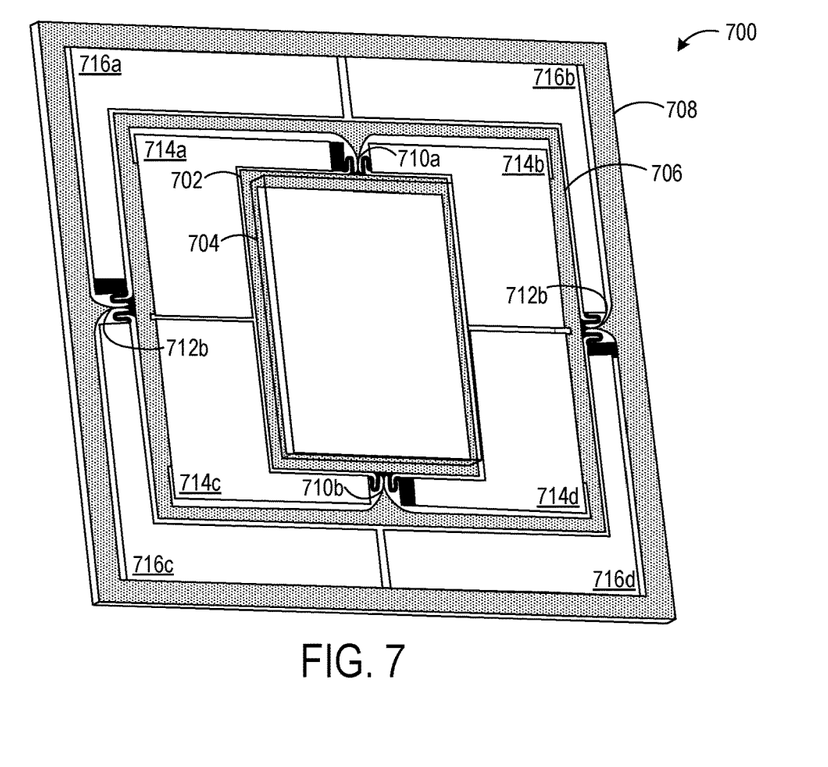
FIG. 7 shows an example pixel-shifting device with an inner frame, middle frame, and outer frame configured for rotational motion about two axes.

In some examples with independently controllable rotation in two different directions, a middle frame may be positioned between an outer and inner frame. The middle frame can be attached to the outer frame with flexures offset ninety degrees from flexures that attach the middle frame to the inner frame to provide for both roll and pitch rotations. FIG. 7 shows an example of a pixel-shifting device 700 that includes an inner frame 702 mounting a path-shifting optical element 704, a middle frame 706, and an outer frame 708. The middle frame 706 is attached to the inner frame 702 via two flexures 710a,b on opposing sides of the inner frame 702, here shown at the top and bottom, while the outer frame 708 is attached to the middle frame 706 via two flexures 712a,b on opposing sides of the middle frame 706 offset ninety degrees from flexures 710a,b. Each flexure is connected to a corresponding pair of transmissions. Here, a set of inner piezoelectric actuators 714a-d is configured to drive rotation of the path-shifting optical element 704 in a first axis, while a set of outer piezoelectric actuators 716a-d is configured to drive rotation of the path-shifting optical element 704 in a second axis.

Figure 8:
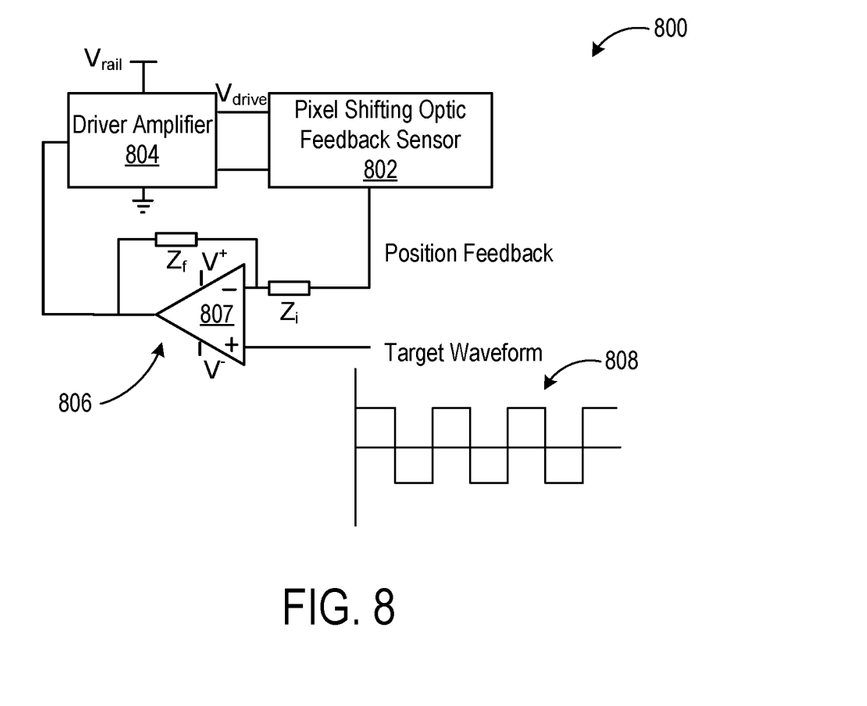
FIG. 8 shows an example pixel-shifting device control circuit.

As mentioned above, a feedback sensor that outputs a signal related to a current angle of a path-shifting optical element may be included in a pixel-shifting device to provide feedback for an actuator control circuit. FIG. 8 shows an example control circuit 800 including a feedback sensor 802, a driver amplifier 804, and a controller amplifier stage 806 comprising an operational amplifier 807. The feedback sensor 802 may take the form of a piezoresistive sensor, for example, and may be built into the path-shifting optical element to sense strain from the one or more flexures and convert the detected strain into a signal. The driver amplifier 804 may be a linear amplifier, a class-D switching amplifier, or any other suitable type of amplifier. The signal from feedback sensor 802 is provided to the inverting input of the operational amplifier 807 of the controller amplifier stage 806, and a target square waveform 808 is provided to the non-inverting input of the operational amplifier 807. The controller amplifier stage 806 outputs a signal with a gain that is a function of the difference between the actual position signal and the target waveform 808. The output of the controller amplifier stage 806 comprises a control signal that is provided to the driver amplifier 804, which amplifies the power of the signal via voltage source $V_{rail}$ to drive the pixel shifting optic 802 via signal $V_{drive}$. The new pixel shifting optic position is fed as a signal back to the controller amplifier 806, and the output of the controller amplifier 806 is input to the driver amplifier 804 once again to adjust the pixel shifting optic 802 accordingly, in a closed loop fashion. The controller amplifier stage 806 may comprise a proportional-derivative (PD) controller, a proportional-integral-derivative (PID) controller, a lead-lag controller, or any other suitable control circuit.

Figure 9:
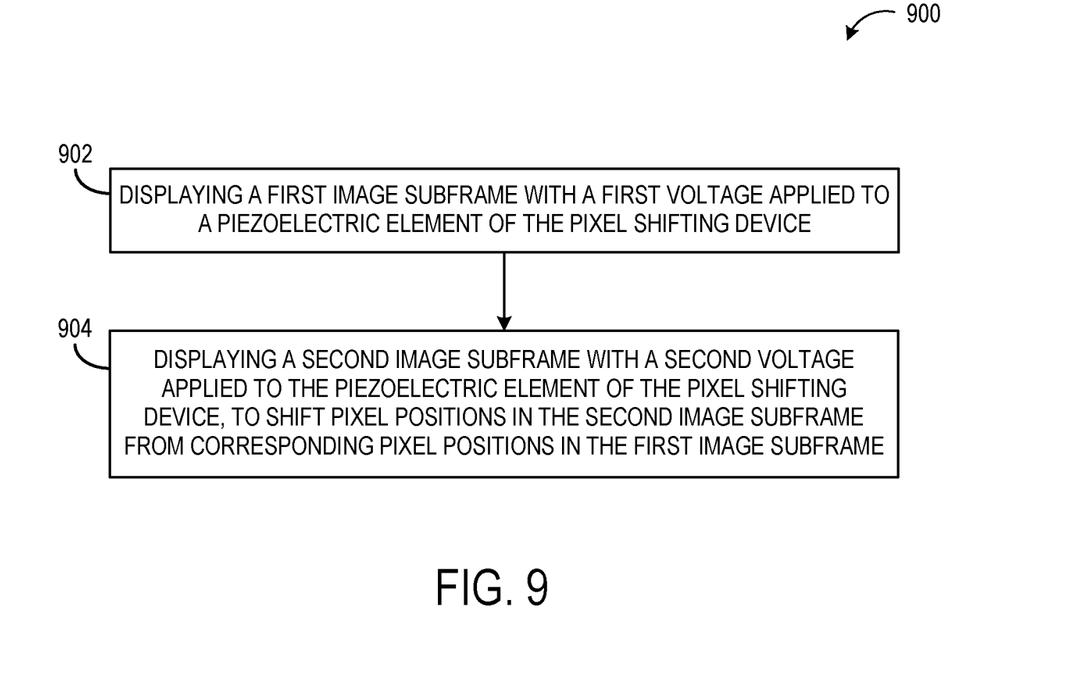
FIG. 9 shows an example method of displaying an image using a pixel-shifting device.

FIG. 9 shows an example method 900 of displaying an image comprising a plurality of image subframes that are displayed in a time-sequential manner. Method 900 includes, at 902, displaying a first image subframe with a first voltage applied to a piezoelectric element of the pixel-shifting device, and at 904, displaying a second image subframe with a second voltage applied to the piezoelectric element of the pixel-shifting device, the second voltage being different than the first voltage, to shift pixel positions in the second image subframe from corresponding pixel positions in the first image subframe. When displayed at a suitably high subframe rate, the first and second image subframes appear to form a single image at a higher resolution than that of the image producing element used to form the subframes. Additional image subframes may be displayed by applying different voltages to the piezoelectric element, or to one or more additional piezoelectric element(s).

In some embodiments, the methods and processes described herein may be tied to a computing system of one or more computing devices. In particular, such methods and processes may be implemented as a computer-application program or service, an application-programming interface (API), a library, and/or other computer-program product.

Figure 10:
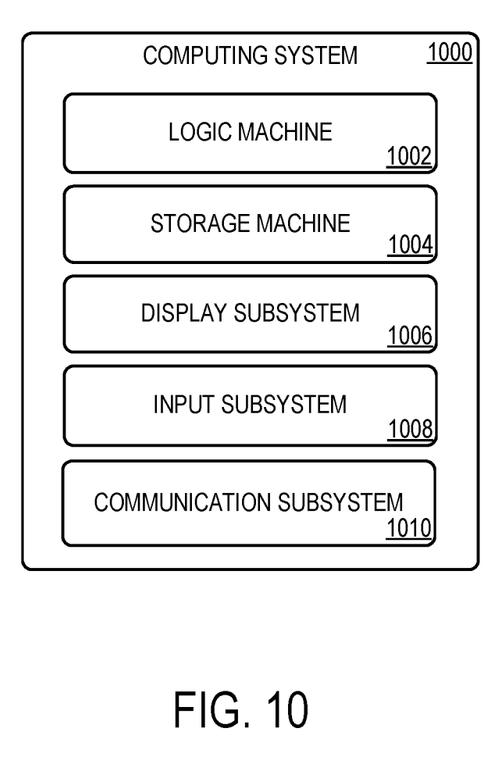
FIG. 10 shows a block diagram of an example computing system.

FIG. 10 schematically shows a non-limiting embodiment of a computing system 1000 that can enact one or more of the methods and processes described above. Computing system 1000 is shown in simplified form. Computing system 1000 may take the form of one or more personal computers, server computers, tablet computers, home-entertainment computers, network computing devices, gaming devices, mobile computing devices, mobile communication devices (e.g., smart phone), and/or other computing devices.

Computing system 1000 includes a logic machine 1002 and a storage machine 1004. Computing system 1000 may optionally include a display subsystem 1006, input subsystem 1008, communication subsystem 1010, and/or other components not shown in FIG. 10.

Logic machine 1002 includes one or more physical devices configured to execute instructions. For example, the logic machine 1002 may be configured to execute instructions that are part of one or more applications, services, programs, routines, libraries, objects, components, data structures, or other logical constructs. Such instruction may be implemented to perform a task, implement a data type, transform the state of one or more components, achieve a technical effect, or otherwise arrive at a desired result.

The logic machine 1002 may include one or more processors configured to execute software instructions. Additionally or alternatively, the logic machine 1002 may include one or more hardware or firmware logic machines configured to execute hardware or firmware instructions. Processors of the logic machine 1002 may be single-core or multi-core, and the instructions executed thereon may be configured for sequential, parallel, and/or distributed processing. Individual components of the logic machine 1002 optionally may be distributed among two or more separate devices, which may be remotely located and/or configured for coordinated processing. Aspects of the logic machine 1002 may be virtualized and executed by remotely accessible, networked computing devices configured in a cloud-computing configuration.

Storage machine 1004 includes one or more physical devices configured to hold instructions executable by the logic machine to implement the methods and processes described herein. When such methods and processes are implemented, the state of storage machine 1004 may be transformed—e.g., to hold different data.

Storage machine 1004 may include removable and/or built-in devices. Storage machine 1004 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 804 may include volatile, nonvolatile, dynamic, static, read/write, read-only, random-access, sequential-access, location-addressable, file-addressable, and/or content-addressable devices.

It will be appreciated that storage machine 1004 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 1002 and storage machine 1004 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 1006 may be used to present a visual representation of data held by storage machine 1004. This visual representation may take the form of a graphical user interface (GUI). As the herein described methods and processes change the data held by the storage machine, and thus transform the state of the storage machine, the state of display subsystem 1006 may likewise be transformed to visually represent changes in the underlying data. Display subsystem 1006 may include one or more display devices utilizing virtually any type of technology. Such display devices may be combined with logic machine 1002 and/or storage machine 1004 in a shared enclosure, or such display devices may be peripheral display devices.

When included, input subsystem 1008 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 1010 may be configured to communicatively couple computing system 1000 with one or more other computing devices. Communication subsystem 1010 may include wired and/or wireless communication devices compatible with one or more different communication protocols. As non-limiting examples, the communication subsystem 1010 may be configured for communication via a wireless telephone network, or a wired or wireless local- or wide-area network. In some embodiments, the communication subsystem may allow computing system 1000 to send and/or receive messages to and/or from other devices via a network such as the Internet.

Another example provides a pixel-shifting device, comprising an outer frame, an inner frame coupled to the outer frame via a flexure, a path-shifting optical element mounted to the inner frame, and one or more piezoelectric actuators configured to drive motion of the inner frame. Each piezoelectric actuator may additionally or alternatively include a thin film of a piezoelectric material deposited and patterned on the structure forming the inner and outer frames. The pixel-shifting device may additionally or alternatively include a plurality of flexures, wherein each flexure of the plurality of flexures is positioned along a corresponding side of the inner frame at a location spaced from a center of the corresponding side. The pixel-shifting device may additionally or alternatively include a feedback sensor configured to sense position feedback from the path-shifting optical element, and a control circuit configured to control power provided to a driver of the piezoelectric actuators based upon the position feedback from the path-shifting optical element. The path-shifting optical element may additionally or alternatively include a prism. The path-shifting optical element may additionally or alternatively include a holographic optical element. The flexure may additionally or alternatively include a curved shape.

Another example provides a display device, comprising, an image producing element comprising a plurality of pixels, and a pixel-shifting device comprising an outer frame, an inner frame coupled to the outer frame via a flexure, a refractive optic mounted to the inner frame, a plurality of piezoelectric actuators coupled to the outer frame, and a controller configured to control the plurality of piezoelectric actuators to control an angle of the refractive optic relative to the outer frame. The display device may additionally or alternatively include a plurality of flexures, wherein each flexure of the plurality of flexures is positioned along a corresponding perimeter side of the inner frame spaced from a center of the corresponding perimeter side. The display device may additionally or alternatively include a feedback sensor configured to sense position feedback from the refractive optic, and a control circuit configured to control power provided to a driver of the piezoelectric actuators based upon the position feedback from the refractive optic. The refractive optic may additionally or alternatively include a prism. The refractive optic may additionally or alternatively include a holographic refractor. The flexure may additionally or alternatively include a curved shape. The display device may additionally or alternatively include a head-mounted display device.

Another example provides, enacted on a display device comprising a pixel-shifting device including a refractive optic and a piezoelectric actuation system, a method of displaying an image comprising a plurality of image subframes that are displayed in a time-sequential manner, the method comprising displaying a first image subframe with a first voltage applied to a piezoelectric element of the pixel-shifting device, and displaying a second image subframe with a second voltage applied to the piezoelectric element of the pixel-shifting device, the second voltage being different than the first voltage, to rotate the refractive optic and thereby shift pixel positions in the second image subframe from corresponding pixel positions in the first image subframe. The display device may additionally or alternatively include a head-mounted display device. The rotating the refractive optic may additionally or alternatively include rotating the refractive optic around a diagonally oriented axis. The method may additionally or alternatively include utilizing a closed-loop feedback circuit to control an angle of the refractive optic. The closed-loop feedback circuit may additionally or alternatively compare a feedback signal to a square wave control signal.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A pixel-shifting device, comprising:
   an outer frame;
   an inner frame coupled to the outer frame via a flexure positioned along a side of the inner frame;
   a path-shifting optical element mounted to the inner frame; and
   one or more piezoelectric actuators each coupled to the outer frame and also coupled to the inner frame by a corresponding transmission comprising a curved shape, each piezoelectric actuator being and configured to drive motion of the inner frame by transmitting movement to the inner frame via the corresponding transmission to shift a plurality of pixels of a display image by a fraction of a pixel.

2. The pixel-shifting device of claim 1, wherein each piezoelectric actuator comprises a thin film of a piezoelectric material deposited and patterned on the structure forming the inner and outer frames.

3. The pixel-shifting device of claim 2, further comprising a plurality of flexures, wherein each flexure of the plurality of flexures is positioned along a corresponding side of the inner frame at a location spaced from a center of the corresponding side.

4. The pixel-shifting device of claim 1, further comprising a feedback sensor configured to sense position feedback from the path-shifting optical element, and a control circuit configured to control power provided to a driver of the piezoelectric actuators based upon the position feedback from the path-shifting optical element.

5. The pixel-shifting device of claim 1, wherein the path-shifting optical element comprises a prism.

6. The pixel-shifting device of claim 1, wherein the path-shifting optical element comprises a holographic optical element.

7. A display device, comprising:
- an image producing element comprising a plurality of pixels, the image producing element being configured to produce a display image; and
- a pixel-shifting device comprising
  - an outer frame,
  - an inner frame coupled to the outer frame via a flexure positioned along a side of the inner frame,
  - a refractive optic mounted to the inner frame, and
  - a plurality of piezoelectric actuators each coupled to the outer frame and also coupled to the inner frame by a corresponding transmission comprising a curved shape; and
- a controller configured to control the plurality of piezoelectric actuators to control an angle of the refractive optic relative to the outer frame by transmitting movement to the inner frame via the corresponding transmission to shift the display image by a fraction of a pixel.

8. The display device of claim 7, further comprising a plurality of flexures, wherein each flexure of the plurality of flexures is positioned along a corresponding perimeter side of the inner frame spaced from a center of the corresponding perimeter side.

9. The display device of claim 7, further comprising a feedback sensor configured to sense position feedback from the refractive optic, and a control circuit configured to control power provided to a driver of the piezoelectric actuators based upon the position feedback from the refractive optic.

10. The display device of claim 7, wherein the refractive optic comprises a prism.

11. The display device of claim 7, wherein the refractive optic comprises a holographic refractor.

12. The display device of claim 7, wherein the display device is a head-mounted display device.

13. Enacted on a display device comprising a pixel-shifting device including a refractive optic and a piezoelectric actuation system, a method of displaying an image comprising a plurality of image subframes that are displayed in a time-sequential manner, the method comprising
- displaying a first image subframe with a first voltage applied to a piezoelectric element coupled to an outer frame of the pixel-shifting device; and
- displaying a second image subframe with a second voltage applied to the piezoelectric element of the pixel-shifting device, the second voltage being different than the first voltage, to rotate the refractive optic relative to the outer frame by transmitting movement of the outer frame caused by the piezoelectric element to an inner frame via a curved transmission and thereby shift pixel positions in the second image subframe from corresponding pixel positions in the first image subframe by a fraction of a pixel.

14. The method of claim 13, wherein the display device comprises a head-mounted display device.

15. The method of claim 13, wherein rotating the refractive optic comprises rotating the refractive optic around a diagonally oriented axis.

16. The method of claim 13, further comprising utilizing a closed-loop feedback circuit to control an angle of the refractive optic.

17. The method of claim 16, wherein the closed-loop feedback circuit compares a feedback signal to a square wave control signal.

18. The method of claim 13, wherein rotating the refractive optic comprises rotating the refractive optic about two different axes.

* * * * *